US 6,658,346 B2

(12) United States Patent
Maegawa (10) Patent No.: US 6,658,346 B2
(45) Date of Patent: Dec. 2, 2003

(54) MISFIRE DETECTION APPARATUS FOR INTERNAL COMBUSTION ENGINE

(75) Inventor: Yoshinori Maegawa, Obu (JP)

(73) Assignee: Denso Corporation, Kariya (JP)

( * ) Notice: Subject to any disclaimer, the term of this patent is extended or adjusted under 35 U.S.C. 154(b) by 303 days.

(21) Appl. No.: 09/906,080

(22) Filed: Jul. 17, 2001

(65) Prior Publication Data

US 2002/0016666 A1 Feb. 7, 2002

(30) Foreign Application Priority Data

Aug. 3, 2000 (JP) ........................................ 2000-235903

(51) Int. Cl.$^7$ .................... F02D 45/00; G06F 19/00; G01M 15/00
(52) U.S. Cl. .................. 701/111; 73/117.3; 123/406.24; 123/406.14
(58) Field of Search ................... 701/111, 110, 701/114, 102; 73/117.3; 123/406.24, 406.12, 406.27, 406.14

(56) References Cited

U.S. PATENT DOCUMENTS

| 5,263,364 | A | * | 11/1993 | Nakayama et al. | ......... 701/110 |
|---|---|---|---|---|---|
| 5,275,037 | A | | 1/1994 | Nakayama et al. | ........ 73/117.3 |
| 5,440,921 | A | * | 8/1995 | Matsuno et al. | ............ 73/117.3 |
| 5,625,143 | A | * | 4/1997 | Kadota | ......................... 701/101 |
| 5,639,960 | A | * | 6/1997 | Nakagawa | ................... 701/101 |
| 5,728,941 | A | | 3/1998 | Yamamoto et al. | ......... 73/117.3 |
| 6,006,155 | A | * | 12/1999 | Wu et al. | .................... 701/111 |
| 6,006,157 | A | * | 12/1999 | Dai et al. | .................... 701/114 |

FOREIGN PATENT DOCUMENTS

| EP | 0 709 664 A1 | * | 1/1996 | .......... G01M/15/00 |
|---|---|---|---|---|
| JP | 7-19103 | * | 1/1995 | ........... F02D/45/00 |
| JP | 9-166042 | * | 6/1997 | ........... F02D/45/00 |

* cited by examiner

Primary Examiner—Hieu T. Vo
(74) Attorney, Agent, or Firm—Nixon & Vanderhye P.C.

(57) ABSTRACT

A misfire detection apparatus for an internal combustion engine determines misfire based on first and second variation amounts calculated based on variations of rotational speed of the internal combustion engine. A second variation amount is calculated, and it is determined whether or not a value obtained by multiplying the second variation amount by −1 is greater than a misfire determination level C1, and if the value is less than the level, process proceeds calculates a final variation amount. If the value is greater than a predetermined value, the process determines the final variation amount from the first variation amount. When the processing has been completed, the process determines whether or not the final variation amount is equal to or greater than the misfire determination level.

25 Claims, 8 Drawing Sheets

MISFIRE DETECTION APPARATUS FOR INTERNAL COMBUSTION ENGINE

CROSS-REFERENCE TO RELATED APPLICATION

The present invention is related to Japanese patent application No. 2000-235903, Aug. 3, 2000; the contents of which are incorporated herein by reference.

FIELD OF THE INVENTION

The present invention relates to a misfire detection apparatus for an internal combustion engine, and more particularly, for a misfire detection apparatus that detects a misfire which occurs in an engine.

DESCRIPTION OF RELATED ART

Conventionally, as a known technique of detecting an engine misfire, Japanese Patent No. 2982381 discloses performing misfire determination in a four-cylinder internal combustion engine based on a rotational speed deviation (first variation amount) between two cylinders where expansion strokes are successively made and a rotational speed deviation (second variation amount) between two cylinders 360° CA (crank angle) ahead where expansion strokes are successively made (hereinbelow referred to as a 360° CA difference calculation).

Further, another known technique of detecting a misfire similarly from two variation amounts is performing misfire determination based on a rotational speed deviation (first variation amount) between two cylinders where expansion strokes are successively made and a rotational speed deviation (second variation amount) between two cylinders 720° CA ahead where successive expansion strokes are successively made (hereinbelow referred to as a 720° CA difference calculation).

However, in the 360° CA difference calculation, where a misfire occurs in a misfire determination subject cylinder and in a cylinder 360° CA ahead of the subject cylinder, the rotational variation which appears in the first variation amount due to the misfire is cancelled by the second variation amount. Therefore, the misfire cannot be detected. Similarly, in the 720° CA difference calculation, when a misfire continuously occurs in a particular same cylinder, the rotational variation due to the misfire is cancelled, and the misfire cannot be detected.

As a technique to detect such specific pattern misfire, the present inventors have proposed a technique disclosed in JP-A No. Hei 10-54295. The technique is, in an eight-cylinder internal combustion engine, calculating a rotational variation amount by cylinder for two cylinders where expansion strokes are successively made as a first variation amount, calculating a deviation between a current rotational speed and a previous rotational speed of the same cylinder as a rotational variation amount, calculating a second variation amount by dividing the rotational variation amount by the number of cylinders, and performing misfire determination based on a deviation between the first and second variation amounts.

However, in any of the above conventional techniques, as a so-called difference calculation is used for performing misfire determination based on the first variation amount and the second variation amount, where the rate of increase in the rotational speed is high at the beginning and then becomes lower upon engine start, such as during abrupt acceleration or the like, there is a possibility of erroneous determination of misfire.

Figure 4:
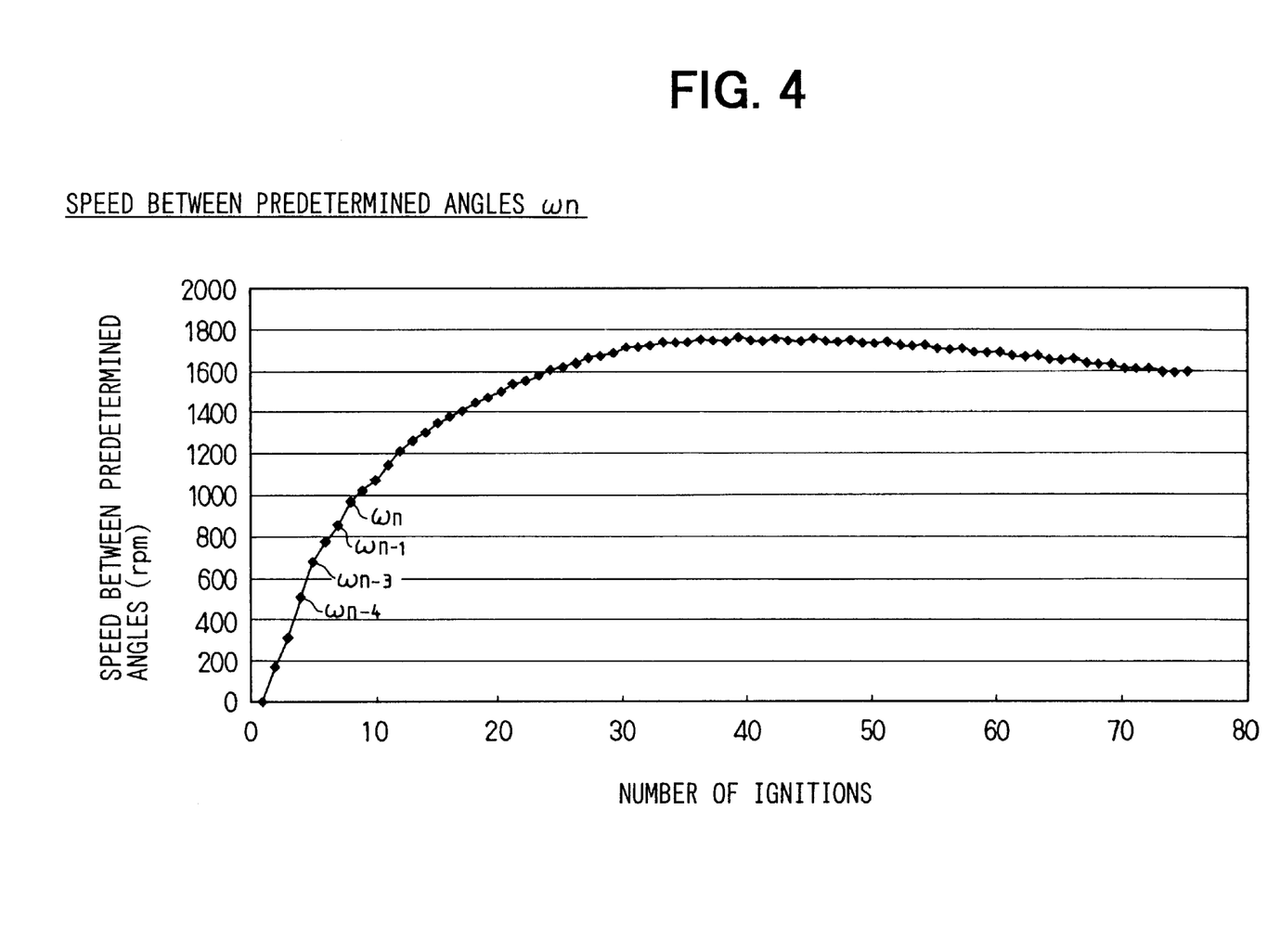
FIG. 4 is a timing chart showing the relation between the number of ignitions and a rotation angle speed of crank shaft upon start of internal combustion engine according to the invention.

For example, for misfire detection by the 360° CA difference calculation in a six-cylinder internal combustion engine, the first variation amount is "$\omega_{n-1} - \omega_n$", and the second variation amount by the 360° CA difference calculation is "$\omega_{n-4} - \omega_{n-3}$", as shown in FIG. 4. Note that $\omega_n$ represents a current rotational speed of misfire determination subject cylinder n, and $\omega_{n-i}$, the i-times previous rotational speed of the misfire determination subject cylinder n.

As in the engine start time, in a running state where the rate of increase in the engine rotational speed is high at the beginning and then becomes lower, as the second variation amount "$\omega_{n-4} - \omega_{n-3}$" becomes greater than the first variation amount "$\omega_{n-1} - \omega_n$", the difference between the first variation amount and the second variation amount (hereinbelow referred to as a final variation amount $\Delta\omega$) is large.

The problem also occurs in the second variation amount in the 720° CA difference calculation and the second variation amount in other difference calculations.

Figure 5:
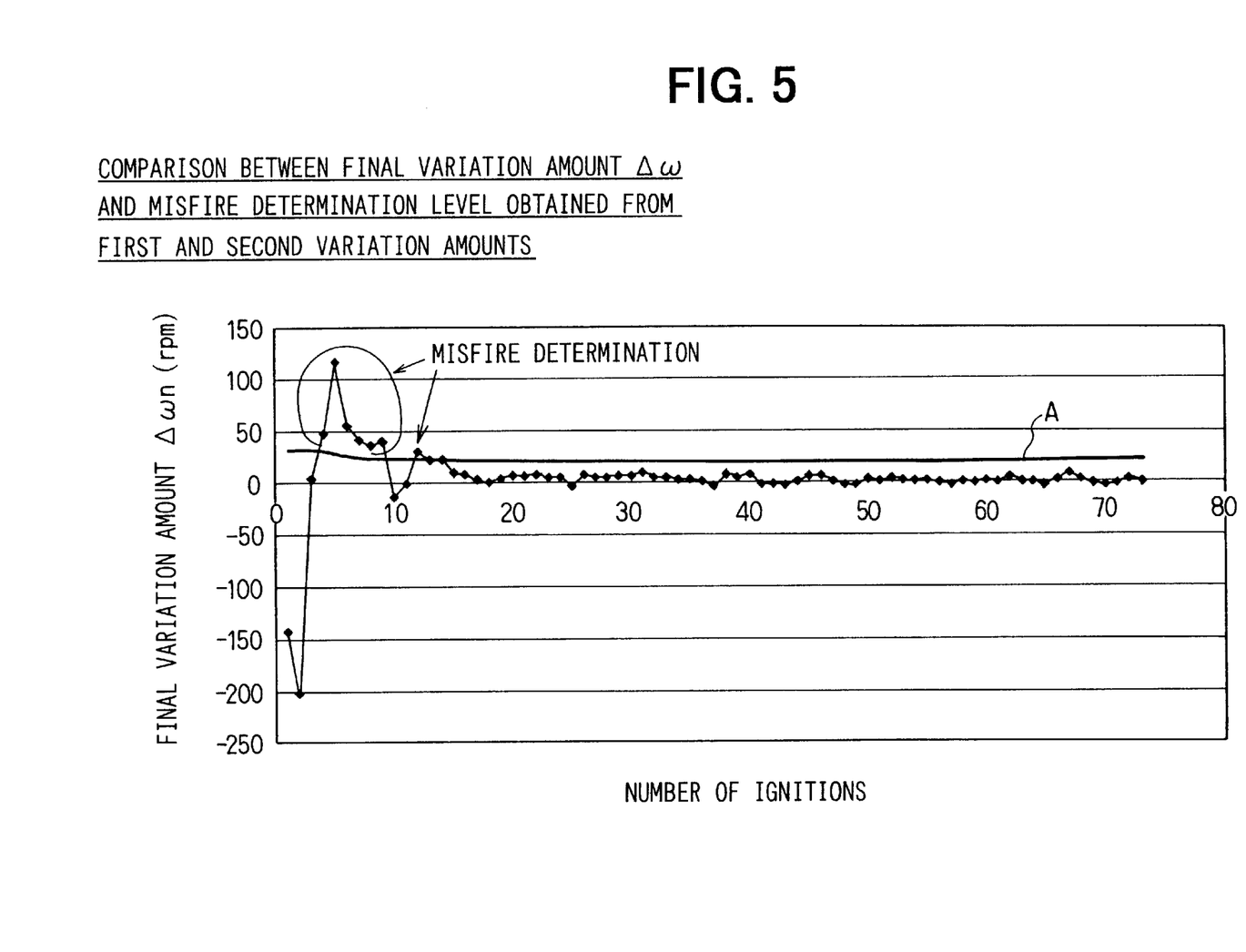
FIG. 5 is a timing chart showing the relation between a final variation amount obtained from first and second variation amounts and a misfire determination level according to the invention.

Accordingly, in a running state where the change rate of rotational speed is high at the beginning and then becomes lower as shown in FIG. 5, the final variation amount $\Delta\omega$ becomes large by the influence of the second variation amount. For this reason, in the above conventional techniques, there is a possibility that the final variation amount $\Delta\omega$ exceeds a misfire determination level (A in FIG. 5), and erroneous determination of misfire may be made even though a misfire has not actually occurred.

SUMMARY OF THE INVENTION

The present invention has been made in consideration of the above situation, and provides a misfire detection apparatus for an internal combustion engine which does not erroneously detect misfire even in a running state where the rate of increase in the engine rotational speed is high at the beginning and then becomes lower upon engine start, abrupt acceleration or the like.

In a first aspect, a misfire detection apparatus for an internal combustion engine is provided that comprises a rotational angle signal output means for outputting a rotational angle signal at a predetermined rotational angle in accordance with rotation of an output shaft of a multiple cylinder internal combustion engine; rotational speed calculation means for calculating a rotational speed of the output shaft of the internal combustion engine in each cylinder, based on the rotational angle signal output from the rotational angle signal output means; first variation amount calculation means for calculating the rotational speed between two cylinders where expansion strokes are successively made, by using the rotational speed calculation means, and calculating a first variation amount based on the rotational speed between the two cylinders; second variation amount calculation means for calculating the rotational speed between two cylinders of the internal combustion engine by using the rotational speed calculation means, and calculating a second variation amount based on the rotational speed between the two cylinders; first misfire determination means for performing misfire determination based on the first variation amount and the second variation amount; and second misfire determination means for performing misfire determination based on the first variation amount, wherein in a running state with a possibility of erroneous misfire detection due to the second variation amount, the second misfire determination means performs misfire determination.

In this arrangement, in the running state with a possibility of erroneous misfire detection due to the second variation amount, as the second misfire determination means performs misfire determination based on the first variation amount, even in a running state where the rate of increase in rotational speed of the internal combustion engine is high at the beginning and then becomes lower, misfire determination can be performed without influence of the second variation amount, thereby erroneous misfire detection can be prevented.

Note that in the present invention, the first variation amount includes a deviation of rotational speed between successive cylinders, a ratio of rotational speed between the successive cylinder, a deviation of time required for predetermined rotation between the successive cylinders, and a ratio of time required for predetermined rotation between the successive cylinders.

Further, in the present invention, the second variation amount includes a deviation of rotational speed between two cylinders, a ratio of rotational speed between the two cylinders, a deviation of time required for predetermined rotation between the two cylinders, and a ratio of time required for predetermined rotation between the two cylinders.

In another aspect, the second variation amount calculation means calculates the rotational speed between two cylinders ahead of the first variation amount calculated by the first variation amount calculation means by a rotational angle of 360° CA (crank angle) where expansion strokes are successively made, by using the rotational speed calculation means, and calculates the second variation amount based on a rotational speed deviation between the two cylinders.

In this arrangement, even in case of misfire determination by the 360° CA difference calculation, in the running state with a possibility of erroneous misfire detection due to the second variation amount, as the second misfire determination means performs misfire determination based on the first variation amount, even in a running state where the rate of increase in rotational speed of the internal combustion engine is high at the beginning and then becomes lower, misfire determination can be performed without influence of the second variation amount, thereby erroneous misfire detection can be prevented.

In another aspect, the second variation amount calculation means calculates the rotational speed between two cylinders ahead of the first variation amount calculated by the first variation amount calculation means by a rotational angle of 720° CA (crank angle) where expansion strokes are successively made, by using the rotational speed calculation means, and calculates the second variation amount based on a rotational speed deviation between the two cylinders.

In this arrangement, even if the misfire determination by the 720° CA difference calculation, while running with a possibility of erroneous misfire detection due to the second variation amount, as the second misfire determination means performs misfire determination based on the first variation amount, even in a running state where the rate of increase in rotational speed of the internal combustion engine is high at the beginning and then becomes lower, misfire determination can be performed without influence of the second variation amount, thereby erroneous misfire detection can be prevented.

In another aspect, the second variation amount calculation means calculates the rotational speed between cylinders away from each other by an integer multiple of a crank angle as minimum-unit, obtained by dividing a crank angle necessary for one combustion cycle of each cylinder by the number of cylinders, by using the rotational speed calculation means, and calculates a value, obtained by dividing the rotational speed deviation between the two cylinders away from each other by the integer multiple of the crank angle by the integer, as the second variation amount, and the first misfire determination means performs misfire determination based on the first variation amount and the second variation amount.

In this arrangement, even in case of misfire determination by the difference calculation, in the running state with a possibility of erroneous misfire detection due to the second variation amount, as the second misfire determination means performs misfire determination based on the first variation amount, even in a running state where the rate of increase in rotational speed of the internal combustion engine is high at the beginning and then becomes lower, misfire determination can be performed without influence of the second variation amount, thereby erroneous misfire detection can be prevented.

In another aspect, the second misfire determination means performs misfire determination after the start of the internal combustion engine until the number of ignitions counted by the ignition counter becomes a predetermined number.

In this arrangement, as the second misfire determination means performs misfire determination during a predetermined period with a possibility of erroneous misfire detection due to the second variation amount after the start of the internal combustion engine, erroneous misfire detection can be prevented.

In another aspect, the second misfire determination means performs misfire determination when the second variation amount, calculated by the second variation amount calculation means based on the rotational speed of the internal combustion engine, is greater than a first predetermined value. In this arrangement, as the second misfire determination means performs misfire determination upon non-constant speed change such as the start of the internal combustion engine, the initial stage of acceleration or the like, erroneous misfire detection in the above running state can be prevented.

In another aspect, the second misfire determination means performs misfire determination when a change rate of the rotational speed calculated by the rotational speed calculation means is equal to or greater than a second predetermined value. In this arrangement, as the second misfire determination means performs misfire determination upon non-constant speed change such as the start of the internal combustion engine, the initial stage of acceleration or the like, erroneous misfire detection in the above running state can be prevented.

In another aspect, the second misfire determination means performs misfire determination from a point where the change rate of the rotational speed calculated by the rotational speed calculation means is equal to or greater than the second predetermined value to a point where the change rate of the rotational speed calculated by the rotational speed calculation means is equal to or less than a third predetermined value which is less than the second predetermined value, and thereafter, the first misfire determination means performs misfire determination.

In this arrangement, as the second misfire determination means performs misfire determination upon non-constant speed change such as the start of the internal combustion engine, the initial stage of acceleration or the like, erroneous misfire detection in the above running state can be prevented.

Further, as the first misfire determination means performs misfire determination after the misfire determination by the second misfire determination means, the precision of determination can be improved.

In another aspect, if a deviation between the first variation amount and the second variation amount is greater than a first determination level, the first misfire determination means determines that a misfire has occurred in the internal combustion engine, and if the first variation amount is greater than a second determination level, the second misfire determination means determines that a misfire has occurred in the internal combustion engine. In this arrangement, as respective misfire determination levels are set for the first misfire determination means and the second misfire determination means, a misfire can be detected with high precision.

In another aspect, the second misfire determination level is a value to detect the misfire more easily than that of the first misfire determination level. That is, where the second misfire determination means performs misfire determination, as the rotational speed of the engine is increasing, the reduction of the rotational speed due to misfire does not clearly appear. Accordingly, in this arrangement, the precision of misfire detection by the second misfire determination means can be improved by setting the misfire determination level to a value to easily detect misfire.

In another aspect, a misfire detection apparatus for an internal combustion engine is provided that comprises rotational angle signal output means for outputting a rotational angle signal at a predetermined rotational angle in accordance with rotation of an output shaft of a multiple cylinder internal combustion engine; rotational speed calculation means for calculating a rotational speed of the output shaft of the internal combustion engine in each cylinder, based on the rotational angle signal outputted from the rotational angle signal output means; first variation amount calculation means for calculating the rotational speed between two cylinders where expansion strokes are successively made, by using the rotational speed calculation means, and calculating a first variation amount based on the rotational speed between the two cylinders; second variation amount calculation means for calculating the rotational speed between two cylinders by the rotational speed calculation means, and calculating a second variation amount based on the rotational speed between the two cylinders; first misfire determination means for performing misfire determination based on the first variation amount and the second variation amount; correction means for correcting the second variation amount; and second misfire determination means for performing misfire determination based on the second variation amount corrected by the correction means and the first variation amount, wherein in a running state with a possibility of erroneous misfire detection due to the second variation amount not corrected by the correction means, the second misfire determination means performs misfire determination.

In this arrangement, even in a running state where the change rate of rotational speed of the internal combustion engine is high at the beginning and then becomes lower upon start of the engine, abrupt acceleration or the like, as the second misfire determination means performs misfire determination by using the value obtained by correcting the second variation amount, erroneous misfire detection can be prevented without influence of the second variation amount.

In another aspect, if a deviation between the first variation amount and the second variation amount is greater than a first determination level, the first misfire determination means determines that a misfire has occurred, and if the deviation between the first variation amount and the second variation amount corrected by the correction means is greater than a second determination level, the second misfire determination means determines that a misfire has occurred. In this arrangement, as respective misfire determination levels are set for the first misfire determination means and the second misfire determination means, a misfire can be detected with high precision.

In another aspect, the second misfire determination level is a value to detect the misfire more easily than that of the first misfire determination level. In this arrangement, the second misfire determination means performs misfire determination when the change rate of rotation of the internal combustion engine is high upon start, abrupt acceleration or the like. At this time, as the misfire determination level is set to the second misfire determination level lower than the first misfire determination level, the precision of misfire determination can be improved in a running state where the change rate of rotational speed of the internal combustion engine is high and a rotational variation amount is not clearly obtained.

In another aspect, the second variation amount calculation means calculates the rotational speed between two cylinders ahead of the first variation amount calculated by the first variation amount calculation means by a rotational angle of 360° CA (crank angle) where expansion strokes are successively made, by using the rotational speed calculation means, and calculates the second variation amount based on a rotational speed deviation between the two cylinders.

In this arrangement, even in case of misfire determination by the 360° CA difference calculation, in the running state with a possibility of erroneous misfire detection due to the second variation amount, as the second misfire determination means performs misfire determination based on the first variation amount, even in a running state where the rate of increase in rotational speed of the internal combustion engine is high at the beginning and then becomes lower, misfire determination can be performed without influence of the second variation amount, thereby erroneous misfire detection can be prevented.

In another aspect, the second variation amount calculation means calculates the rotational speed between two cylinders ahead of the first variation amount calculated by the first variation amount calculation means by a rotational angle of 720° CA (crank angle) where expansion strokes are continuously made, by using the rotational speed calculation means, and calculates the second variation amount based on a rotational speed deviation between the two cylinders.

In this arrangement, even in case of misfire determination by the 720° CA difference calculation, in the running state with a possibility of erroneous misfire detection due to the second variation amount, as the second misfire determination means performs misfire determination based on the first variation amount, even in a running state where the rate of increase in rotational speed of the internal combustion engine is high at the beginning and then becomes lower, misfire determination can be performed without influence of the second variation amount, thereby erroneous misfire detection can be prevented.

In another aspect, the second variation amount calculation means calculates the rotational speed between cylinders away from each other by an integer multiple of a crank angle as minimum-unit, obtained by dividing a crank angle necessary for one combustion cycle of each cylinder by the number of cylinders, by using the rotational speed calculation means, and calculates a value, obtained by dividing the rotational speed deviation between the two cylinders away from each other by the integer multiple of the crank angle by the integer, as the second variation amount, and the first misfire determination means performs misfire determination based on the first variation amount and the second variation amount. In this arrangement, even in case of misfire determination by the difference calculation, in the running state with a possibility of erroneous misfire detection due to the second variation amount, as the second misfire determination means performs misfire determination based on the first variation amount, even in a running state where the rate of increase in rotational speed of the internal combustion engine is high at the beginning and then becomes lower, misfire determination can be performed without influence of the second variation amount, thereby erroneous misfire detection can be prevented.

In another aspect, the correction means sets a correction amount to correct the second variation amount based on the running state of the internal combustion engine detected by the running state detection means, and corrects the second variation amount based on the correction amount. In this arrangement, as the correction amount to correct the second variation amount can be set in accordance with various running states of the internal combustion engine, the precision of misfire determination by the second misfire determination means can be improved.

In another aspect, the running state of the internal combustion engine detected by the running state detection means is a variation amount of the rotational speed calculated by the rotational speed calculation means. In this arrangement, as the correction amount to correct the second variation amount can be set in accordance with the variation amount of rotational speed of the internal combustion engine, the precision of misfire determination by the second misfire determination means can be improved. In another aspect, the running state of the internal combustion engine detected by the running state detection means is the second variation amount calculated by the second variation amount calculation means. In this arrangement, as the correction amount to correct the second variation amount can be set in accordance with the second variation amount, the precision of misfire determination by the second misfire determination means can be improved.

In another aspect, the second misfire determination means performs misfire determination after the start of the internal combustion engine until the number of ignitions counted by the ignition counter becomes a predetermined number. In this arrangement, as the second misfire determination means performs misfire determination during a predetermined period with a possibility of erroneous misfire detection due to the second variation amount after the start of the internal combustion engine, erroneous misfire detection can be prevented.

In another aspect, the second misfire determination means performs misfire determination when the second variation amount calculated by the second variation amount calculation means based on the rotational speed of the internal combustion engine is greater than a first predetermined value. In this arrangement, as the second misfire determination means performs misfire determination upon non-constant speed change such as the start of the internal combustion engine, the initial stage of acceleration or the like, erroneous misfire detection in the above running state can be prevented.

In another aspect, the second misfire determination means performs misfire determination when a change rate of the rotational speed calculated by the rotational speed calculation means is equal to or greater than a second predetermined value. In this arrangement, as the second misfire determination means performs misfire determination upon non-constant speed change such as the start of the internal combustion engine, the initial stage of acceleration or the like, erroneous misfire detection in the above running state can be prevented.

In another aspect, the second misfire determination means performs misfire determination from a point where the change rate of the rotational speed calculated by the rotational speed calculation means is equal to or greater than the second predetermined value to a point where the change rate of the rotational speed calculated by the rotational speed calculation means is equal to or less than a third predetermined value which is less than the second predetermined value, and thereafter, the first misfire determination means performs misfire determination. In this arrangement, as the second misfire determination means performs misfire determination upon non-constant speed change such as the start of the internal combustion engine, the initial stage of acceleration or the like, erroneous misfire detection in the above running state can be prevented.

Further, as the first misfire determination means performs misfire determination after the misfire determination by the second misfire determination means, the precision of determination can be improved.

In another aspect, provided is a misfire detection apparatus for an internal combustion engine wherein the second misfire determination means performs misfire determination for a predetermined period after the start of the internal combustion engine. In this arrangement, misfire erroneous determination due to the second variation amount can be prevented.

In another aspect, provided is a misfire detection apparatus for an internal combustion engine wherein the second misfire determination means performs misfire determination for a predetermined period after acceleration at the internal combustion engine. In this arrangement, misfire erroneous determination due to the second variation amount can be prevented.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Preferred embodiments of the present invention will now be described in detail in accordance with the accompanying drawings.

<First Embodiment>

Figure 1:
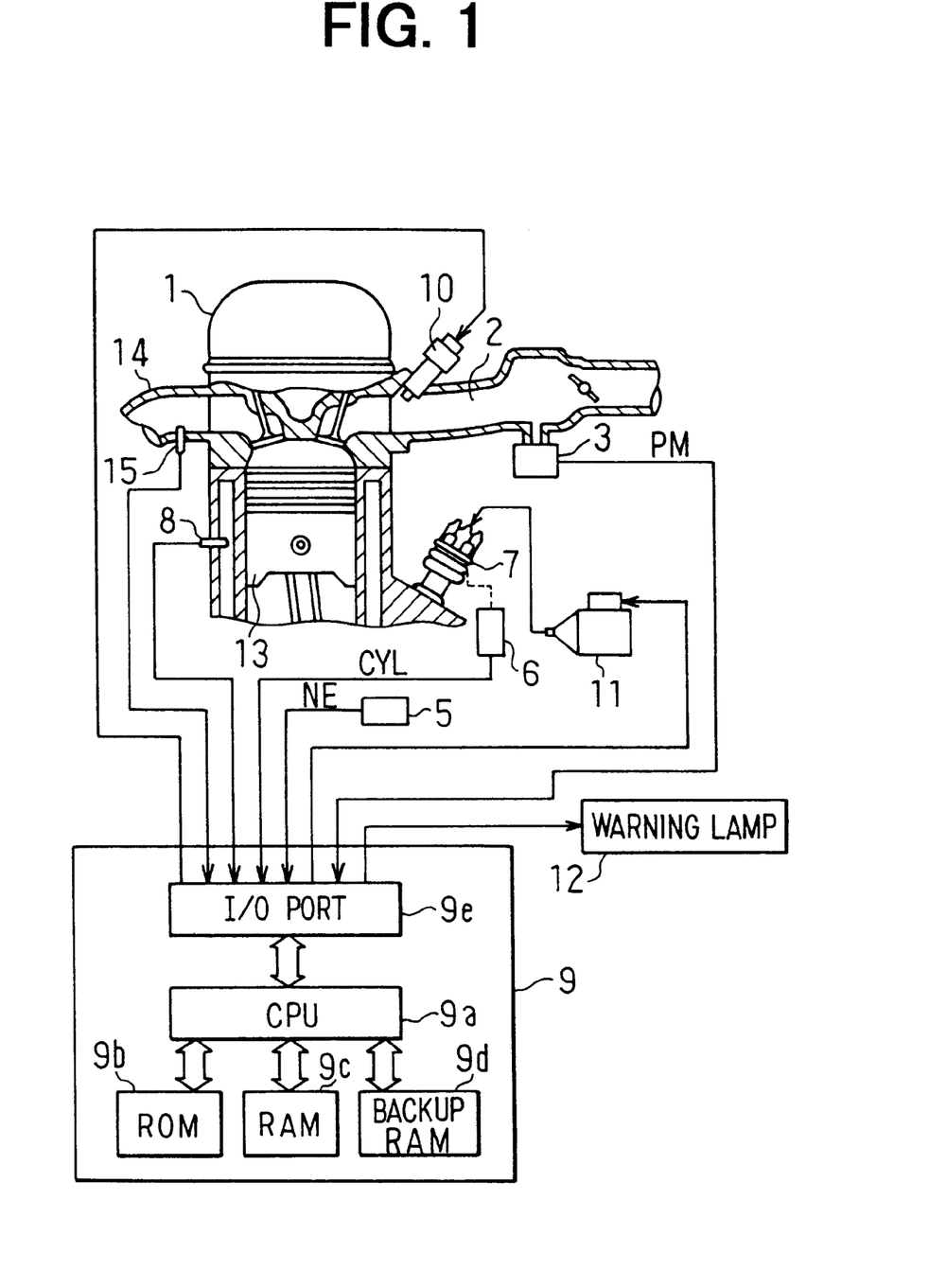
FIG. 1 is a schematic view showing a misfire determination apparatus according to a first embodiment of the present invention.

FIG. 1 is a schematic diagram showing a misfire determination apparatus according to a first embodiment of the present invention. In FIG. 1, reference numeral 1 denotes an internal combustion engine having 6 cylinders (V-shaped six-cylinder internal combustion engine) where respective groups of 3 cylinders are arranged in a V shape; 2, a suction pipe which guides intake air introduced from an air cleaner (not shown) into the internal combustion engine 1; 3, an intake pressure sensor which detects pressure in the suction pipe 2. A detection signal from the intake pressure sensor 3 is input into an electronic control unit 9 to be described later.

Numeral 5 denotes a rotational angle sensor, provided on a crank shaft (not shown) of the internal combustion engine 1, which outputs a signal at each predetermined crank angle to obtain a rotational speed Ne of the internal combustion engine 1. The rotational angle sensor 5 makes 1 turn at 360° CA (crank angle). Numeral 6 denotes a reference position sensor, provided in a distributor 7, which outputs a signal to identify each cylinder. The reference position sensor makes 1 turn at 720° CA. The reference position sensor outputs the signal every time a piston 13 of e.g. first cylinder reaches a top dead center (#1TDC). Note that detection signals from the rotational angle sensor 5 and the reference position sensor 6 are also inputted into the electronic control unit 9.

Numeral 8 denotes a water temperature sensor, provided in a cooling water channel of the internal combustion engine 1, which detects the temperature of the cooling water. A detection signal from the water temperature sensor 8 is also inputted into the electronic control unit 9. The electronic control unit (ECU) 9 calculates optimum control amounts for fuel system and ignition system based on the detection signals from the above sensors and other sensors (not shown), and outputs control signals to accurately control an injector 10, an igniter 11 and the like.

Further, upon reception of the control signal from the igniter 11, an ignition coil (not shown) supplies a high voltage to an ignition plug (not shown) provided in each cylinder via the distributor 7. The ignition plug generates a spark to cause combustion of air-fuel mixture by the high voltage.

Further, the ECU 9 has a well-known CPU 9a for calculation processing, a ROM 9b for storing control programs and control constants necessary for control, a RAM 9c for temporarily storing calculation data during the operation of the CPU 9a, a backup RAM 9d for storing calculation data when the CPU 9a does not operate, and an I/O port 9e for input/output of signal from/to the outside the ECU 9.

Numeral 12 denotes a warning lamp which notifies an operator and the like of abnormality of the internal combustion engine when it is determined that some abnormality such as a misfire has occurred in the internal combustion engine; 14, an exhaust pipe; and 15, an air fuel ratio sensor which detects the concentration of oxygen in exhaust gas.

Next, misfire determination by the ECU 9 will be described. In the present embodiment, the ECU 9 has first misfire determination means and second misfire determination means. The first misfire determination means performs misfire determination by a so-called difference calculation such as 360° CA difference calculation and 720° CA difference calculation. The second misfire determination means performs misfire determination from a first variation amount calculated based on a rotational speed between successive two cylinders.

Note that the difference calculation is used for performing misfire determination from the first variation amount calculated based on the rotational speed between successive two cylinders and a second variation amount as a correction term to correct an error included in the first variation amount.

As described later, the first variation amount is obtained from a deviation of rotational speed between successive two cylinders (e.g., $\omega_{n-1} - \omega_n$). The rotational speed of each cylinder is calculated from the detection signal from the rotational angle sensor 5 provided on the crank shaft. Note that $\omega_n$ represents the rotational speed of current misfire determination subject cylinder, and $\omega_{n-1}$, an i-times previous misfire determination subject cylinder.

At this time, the first variation amount $\Delta\omega_n$ may have a large value even if the internal combustion engine is run at a constant speed, due to manufacturing variation, attachment error and the like of the rotational angle sensor 5 (hereinafter referred to as tolerances of the rotational angle sensor 5). Further, upon deceleration running of the internal combustion engine, the first variation amount $\Delta\omega_n$ increases, and there is a possibility that these factors conspire to cause erroneous determination of misfire.

To improve the precision of misfire detection, in the 360° CA difference calculation, for example, a deviation of rotational speed between cylinders 360° CA ahead where the rotational speeds are detected respectively at the same tooth of the rotation angle sensor 5, is calculated as the second variation amount (in case of six-cylinder internal combustion engine, $\omega_{n-4} - \omega_{n-3}$), and if the deviation between the first variation amount and the second variation amount ($\Delta\Delta\omega_n = (\omega_{n-1} - \omega_n) - (\omega_{n-4} - \omega_{n-3})$) is greater than a predetermined misfire determination value, it is determined that a misfire has occurred. In the 360° CA difference calculation, the detection error of the first variation amount upon acceleration/deceleration as well as the tolerances of the rotational angle sensor 5 can be simultaneously corrected.

Further, another known difference calculation is calculating the second variation amount by dividing the deviation between a current rotational speed and a previous rotational speed of the same cylinder by the number of cylinders (e.g. in case of six-cylinder internal combustion engine, $(\omega_{n-7} - \omega_{n-1})/6$), and determining that a misfire has occurred if the deviation between the first variation amount and the second variation amount ($\Delta\omega_n = (\omega_{n-1} - \omega_n) - (\omega_{n-7} - \omega_{n-1})/6$) is greater than a predetermined misfire determination value. In this case, the detection error of the first variation amount upon acceleration/deceleration of the internal combustion engine can be corrected, however, as the error of the rotational angle sensor 5 cannot be corrected, tolerance learning should be performed to correct the error of the rotational angle sensor 5.

However, in misfire determination by these difference calculations, in a running state where the rate of increase in rotational speed of the internal combustion engine is high at the beginning and then becomes lower, i.e., during a predetermined period after the start of the internal combustion engine or upon the initial stage of acceleration, the second variation amount has an adverse effect on misfire determination. For example, in case of the above-described 360° CA difference calculation, the second variation amount $(-(\omega_{n-4}-\omega_{n-3}))$ is greater than the first variation amount $(\omega_{n-1}-\omega_n)$, and as a result, the value of final variation amount $\Delta\omega_n$ might be greater than the misfire determination value.

In the present embodiment, in the running state where the rate of increase in the speed of the internal combustion engine is high at the beginning and then becomes lower, the ECU 9 performs misfire determination by using the second misfire determination means that performs misfire determination from the first variation amount calculated based on the rotational speed between successive two cylinders.

Further, if a misfire is determined by the first misfire determination means or the second misfire determination means, the ECU 9 increments a counter. Then, if the counter value is over a final misfire determination level at misfire determination timing, it is determined a misfire has occurred.

The misfire determination timing may be set by 400 ignitions in consideration of influence on a catalyst due to misfire, or by 1000 ignitions in consideration of degradation of emission. Further, two determination timings may be combined.

Next, an example of misfire detection processing executed in the ECU 9 will be described with reference to the flowchart of FIG. 2. For the sake of simplification of explanation, the first misfire determination means performs misfire determination by the 360° CA difference calculation in a six-cylinder internal combustion engine.

First, at step 100, time T30($i$) required for rotation of the crank shaft to e.g. 30° CA is calculated from the deviation between a previous interruption time and a current interruption time, and the process proceeds to step 101. At step 101, it is determined whether or not the current interruption timing corresponds to the top dead center. If it is determined that the interruption timing does not correspond to the top dead center, the present routine ends. On the other hand, if the interruption timing corresponds to the top dead center, the interruption request is satisfied, and the process proceeds to step 102.

At step 102, time T120($i$) required for rotation of the crank shaft to 120° CA is calculated by accumulating the time T30($i$) required for the rotation of the crank shaft to 30° CA, calculated at step 100, time T30($i$-1) which was obtained upon the last rotation, time T30($i$-2) which was obtained upon twice-previous rotation and time T30($i$-3) which was obtained upon thrice-previous rotation. Then the process proceeds to step 103, at which an average rotational speed $\omega_n$ in the crank angle 120° CA is calculated. More particularly, the reciprocal of the time T120($i$) obtained at step 102 is set as the average rotational speed $\omega_n$. Then the process proceeds to step 104.

At step 104, a counter CIG which counts the number of ignitions from the engine start to the present routine is incremented, and the process proceeds to step 105. At step 105, it is determined whether or not the value of the counter CIG is 50 or less, so as to determine whether or not the current state is within a predetermined period from the engine start. If the CIG value is greater than 50, i.e., it is determined that 50 ignitions have been made from the engine start, the process proceeds to step 109, at which the final variation amount $\Delta\omega_n$ is calculated from the following expression (1), and the process proceeds to step 110.

$$\Delta\omega_n=(\omega_{n-1}-\omega_n)-(\omega_{n-4}-\omega_{n-3}) \quad (1)$$

Note that $(\omega_{n-1}-\omega_n)$ corresponds to the first variation amount, and $(\omega_{n-4}-\omega_{n-3})$, the second variation amount. Further, the processing of misfire determination based on the final variation amount $\Delta\omega_n$ calculated at step 109 corresponds to the first misfire determination means.

On the other hand, if it is determined at step 105 that the CIG value is equal to or less than 50, i.e., it is determined that 50 or less ignitions have been made from the engine start, the process proceeds to step 106. At step 106, the second variation amount $\Delta\omega_2$ is calculated and the process proceeds to step 107. The second variation amount $\Delta\omega_2$ is expressed by:

$$\Delta\omega_2=\omega_{n-4}-\omega_{n-3} \quad (2)$$

At step 107, it is determined whether or not the second variation amount $\Delta\omega_2$ has an adverse effect on misfire determination by determining whether or not a value obtained by multiplying the second variation amount $\Delta\omega_2$ by $-1$ is greater than a misfire determination level C1. If the value calculated based on the second variation amount $\Delta\omega_2$ is less than the misfire determination level C1, it is determined that the second variation amount $\Delta\omega_2$ has no adverse effect on the misfire determination but improves the precision of misfire determination. Then the process proceeds to step 109, at which the final variation amount $\Delta\omega_n$ is calculated based on the expression (1), and the process proceeds to step 110.

On the other hand, if it is determined at step 107 that the value calculated based on the second variation amount $\Delta\omega_2$ is greater than the misfire determination level C1, it is determined that the second variation amount $\Delta\omega_2$ has an adverse effect on the misfire determination, and the process proceeds to step 108, at which the final variation amount $\Delta\omega_n$ is calculated only with the first variation amount as in the following expression (3).

$$\Delta\omega_n=\omega_{n-1}-\omega_n \quad (3)$$

Note that the processing of misfire determination based on the final variation amount $\Delta\omega_n$ calculated at step 108 corresponds to the second misfire determination means.

When the processing at steps 108 or 109 has been completed, the process proceeds to step 110, at which it is determined whether or not the final variation amount $\Delta\omega_n$ is equal to or greater than the misfire determination level C1. If it is determined that final variation amount $\Delta\omega_n$ is equal to or greater than the misfire determination level C1, it is determined that a misfire has occurred to the current subject cylinder, and the process proceeds to step 111.

At step 111, a flag xMF indicative of occurrence of misfire is set to 1, and the process proceeds to step 112. At step 112, a misfire counter CMIS to count the number of misfires is incremented, and the present routine ends. On the other hand, if it is determined at step 110 that the final variation amount $\Delta\omega_n$ is less than the misfire determination level C1, the process proceeds to step 113, at which the misfire flag xMF is cleared, and the present routine ends.

Next, final misfire determination processing by the ECU 9 will be described with reference to the flowchart of FIG. 3.

First, at step 200, it is determined whether or not the current interruption timing corresponds to the top dead center of each cylinder. If it is determined that the interruption timing does not correspond to the top dead center, the present routine ends. On the other hand, if it is determined that the interruption timing corresponds to the top dead center, the process proceeds to step 201.

At step 201, a second counter CIG2 to count the number of ignitions is incremented, and the process proceeds to step 202. At step 202, it is determined whether or not the value of the second counter CIG2 is equal to or greater than 400. If the count value is less than 400, the present routine ends. If the count value is equal to or greater than 400, the process proceeds to step 203 to finally determine whether or not a misfire has occurred.

Figure 2:
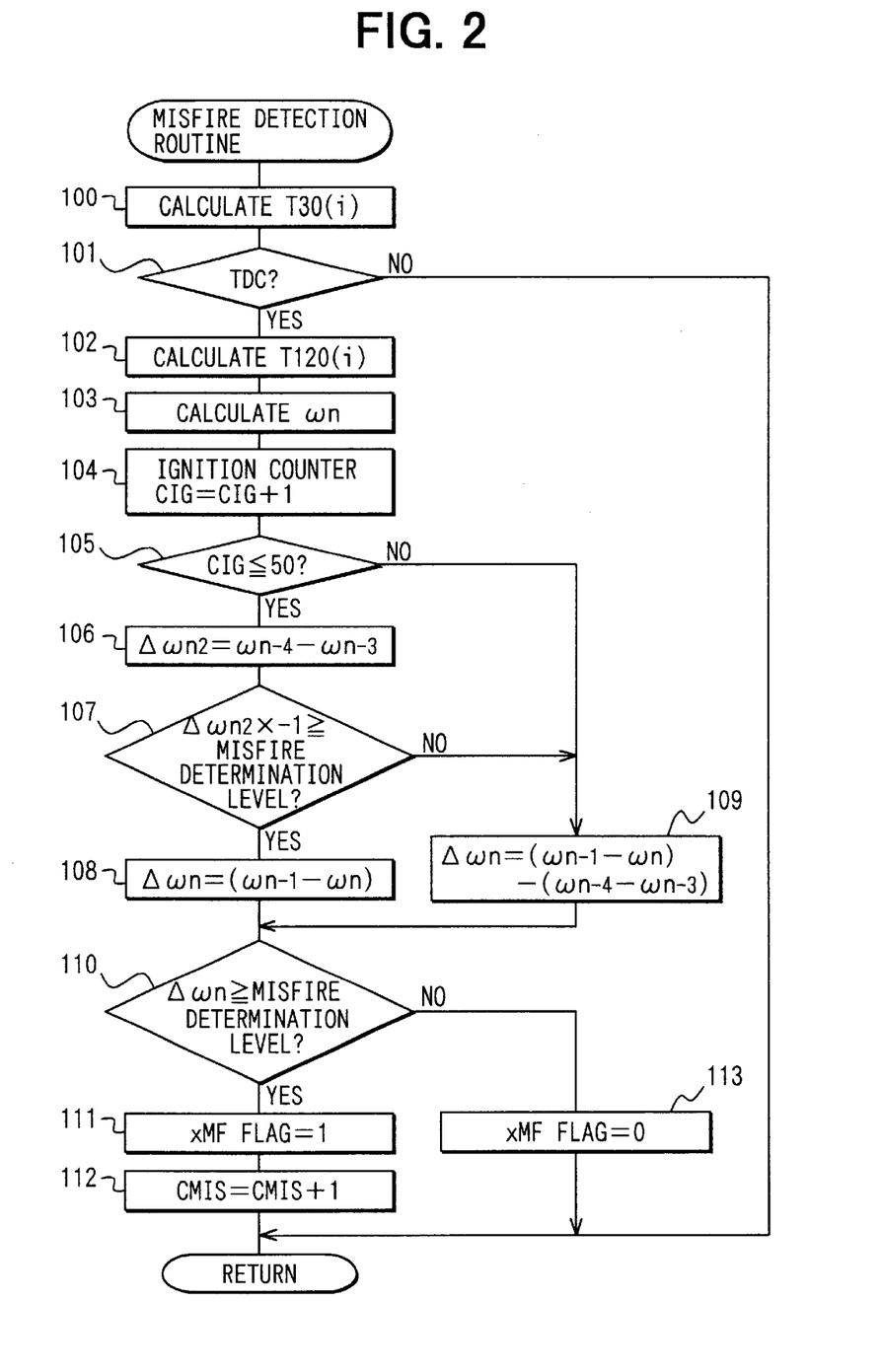
FIG. 2 is a flowchart showing a procedure of misfire detection according to the first embodiment of the invention.

At step 203, it is determined whether or not the count value of the misfire counter CMIS at step 112 in FIG. 2 is equal to or higher than a final misfire determination level. Note that the final misfire determination level is an arbitrary value equal to or less than 400. For example, in a case where it is finally determined that a misfire has occurred when the number of misfires is 10% of the number of ignitions, the final misfire determination level may be set to 40.

If an affirmative determination is made at step 203, it is determined at step 204 that a misfire has occurred. For example, processing to set the final misfire determination flag to 1, or the like, is performed. Thereafter, the warning lamp 12 is turned on at step 205, then the process proceeds to step 206. On the other hand, if a negative determination is made at step 203, it is finally determined that a misfire has not occurred, then the process skips steps 204 and 205, and proceeds to step 206.

At step 206, in preparation for the next final misfire determination, the value of the second counter CIG2 is set to 0 (cleared), then at step 207, the value of the misfire counter CMIS is set to 0 (cleared), and the present routine ends.

Figure 3:
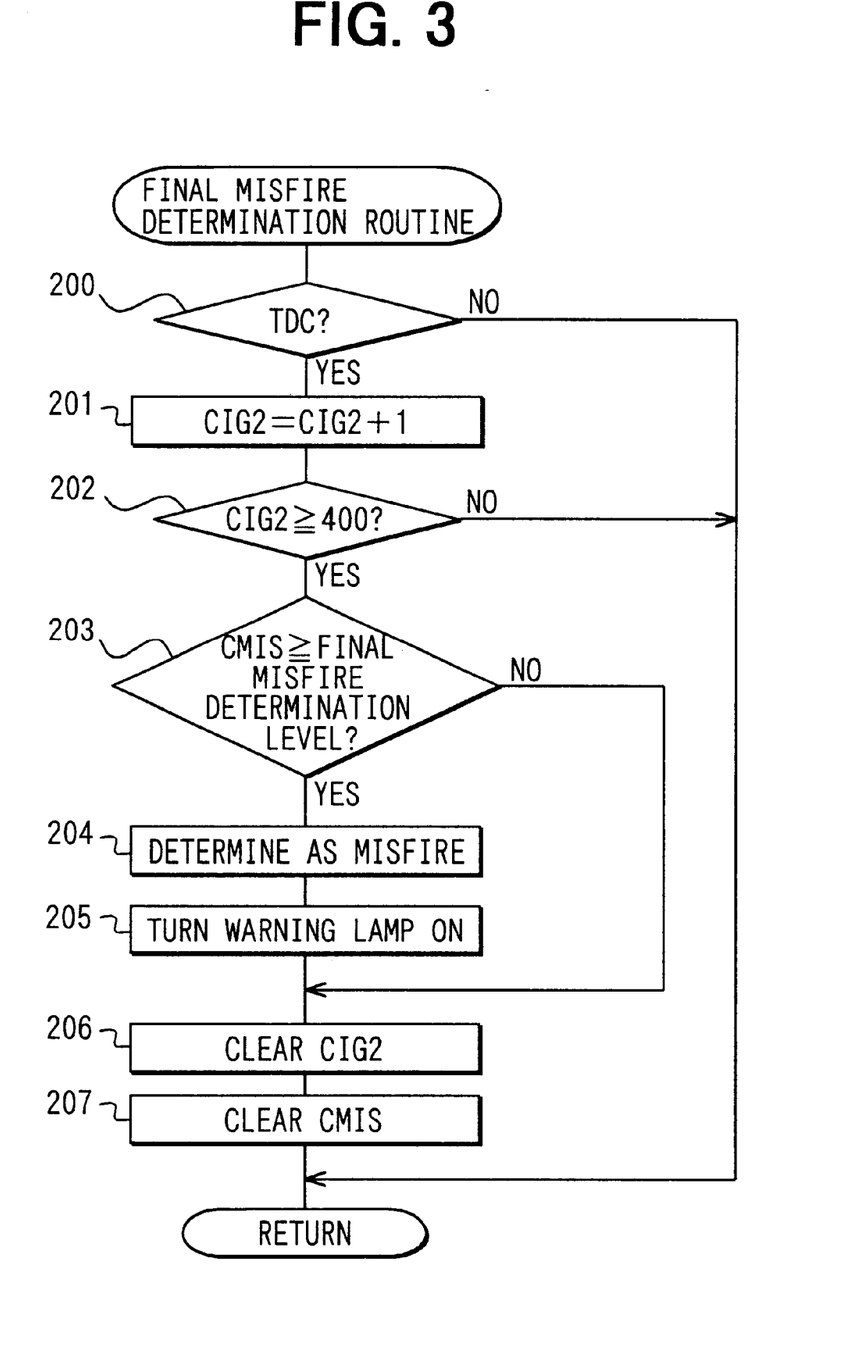
FIG. 3 is a flowchart showing a final misfire determination processing according to the first embodiment of the invention.

Note that in the present embodiment, final misfire determination is made by every 400 ignitions at step 202 in FIG. 3, however, the final misfire determination is not necessarily performed by every 400 ignitions. For example, the final misfire determination may be performed by 1000 ignitions.

Figure 6:
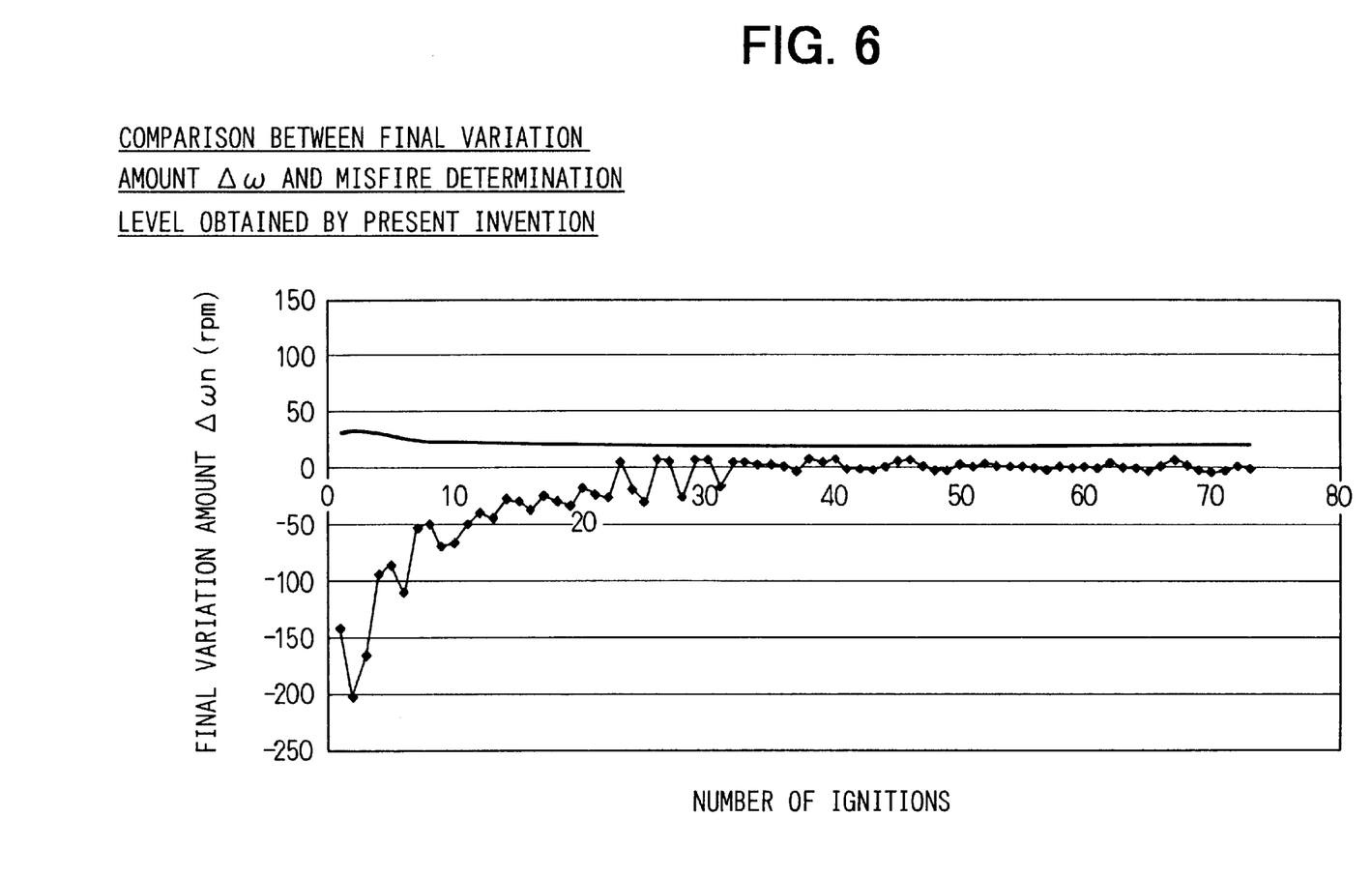
FIG. 6 is a timing chart showing the relation between the final variation amount by the misfire detection processing according to the first embodiment and the misfire determination level according to the invention.

Next, misfire determination of the conventional techniques will be described with reference to the timing chart of FIG. 5. Further, the misfire determination of the present embodiment will be described with reference to the timing chart of FIG. 6. Note that FIGS. 5 and 6 show the final variation amount $\Delta\omega_n$ with respect to time elapsed from the start of the internal combustion engine. In these figures, a solid line represents a misfire determination level, and a dot, ignition timing.

Within a predetermined period from the start of the internal combustion engine, the rate of increase in rotational speed is high at the beginning and then becomes lower. In a case where the final variation amount $\Delta\omega_n$ is obtained by the CA difference calculation (expression (1)) as in the conventional technique, even if the first variation amount has a minus value, the final variation amount appears as a value on the plus side as the second variation amount is greater than the first variation amount to the minus side. Accordingly, the final variation amount $\Delta\omega_n$ sometimes exceeds the misfire determination level although a misfire has not occurred.

In the present embodiment, during the period where the rate of increase in rotational speed of the engine is high at the beginning and then becomes lower, the final variation amount $\Delta\omega_n$ is obtained based on the expression (3). Even in this running state, erroneous misfire detection can be prevented while the final variation amount is prevented from exceeding the misfire determination level at normal times where misfire does not occur, as shown in FIG. 6.

Note that in the present embodiment, for the sake of simplification of explanation, the final variation amount $\Delta\omega_n$ is calculated by the 360° CA difference calculation at step 109 in the flowchart of FIG. 2, however, it may be arranged such that the final variation amount $\Delta\omega_n$ is simultaneously calculated by the 720° CA difference calculation and another CA difference calculation at step 109, then the final variation amounts $\Delta\omega_n$ calculated by the respective CA difference calculi are compared with the misfire determination value. If even one of the final variation amounts is greater than the misfire determination value, it is determined that a misfire has occurred, and the process proceeds to step 111.

Note that in case of six-cylinder internal combustion engine, in the 720° CA difference calculation, the final variation amount $\Delta\omega_n$ is calculated by the following expression:

$$\Delta\omega_n=(\omega_{n-1}-\omega_n)-(\omega_{n-7}-\omega_{n-6}) \qquad (4)$$

Further, as an example of the other CA difference calculation, in case of six-cylinder internal combustion engine, the final variation amount $\Delta\omega_n$ is calculated by the following expression:

$$\Delta\omega_n=(\omega_{n-1}-\omega_n)-(\omega_{n-7}-\omega_{n-1})/6 \qquad (5)$$

Further, in the above first embodiment, upon non-constant speed change such as the start of the internal combustion engine, the initial stage of acceleration or the like, the second misfire determination means performs misfire determination, however, it may be arranged such that in such running state, the second variation amount is corrected and misfire determination is performed based on the first variation amount and the corrected second variation amount.

In this case, the final variation amount $\Delta\omega_n$ may be calculated by using the following expression in place of the expression (3) used at step 108 in the flowchart of the present embodiment:

$$\Delta\omega_n=(\omega_{n-1}-\omega_n)-K\times(\omega_{n-4}-\omega_{n-3}) \qquad (4)$$

Figure 7:
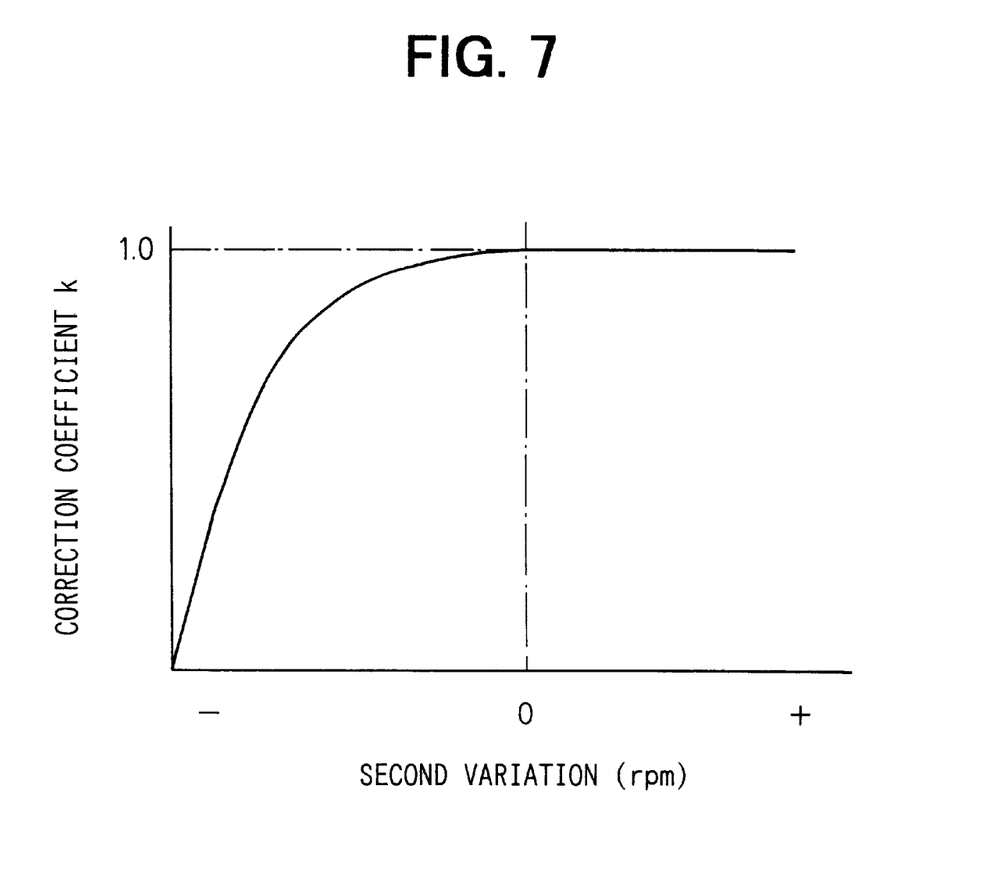
FIG. 7 is a map for setting a correction coefficient K in accordance with the second variation amount according to the invention.

Note that K is a correction coefficient which is set in correspondence with the second variation amount as shown in FIG. 7. In the present embodiment, the coefficient K is set to a value closer to 0 from 1 as the second variation value $\Delta\omega_n(=\omega_{n-1}-\omega_{n-3})$ increases to the minus side.

In this manner, the final variation amount $\Delta\omega_n$ corresponding to a running state can be calculated by setting a correction coefficient in correspondence with the second variation amount, thereby misfire detection can be performed with high precision. Note that the correction coefficient setting may be performed based on a map as shown in FIG. 7 or may be performed by calculation in correspondence with load on the internal combustion engine or the like. The processing to correct the second variation amount by the correction coefficient K corresponds to the correction means.

Note that in the present embodiment, the running state with possibility of erroneous misfire detection due to the second variation amount in case of misfire determination by using the CA difference calculation is described as a state where the number of ignitions is equal to or less than a predetermined number (50 ignitions) and the second variation amount $\Delta\omega_{n2}\times-1$ is equal to or greater than a predetermined value (misfire determination level), however, the present invention is not limited to this running state.

For example, within a predetermined period after the start of the internal combustion engine, as the running state with a possibility of erroneous misfire detection due to the second variation amount continues, it may be arranged such that the second misfire determination means performs misfire determination for a predetermined period from the start of the engine. Further, the number of ignitions after the start of the engine may be replaced with the number of fuel injections.

Further, the period with a possibility of erroneous misfire detection after the start of the engine is a period in which there is a great difference between the rotational speed of the engine upon calculation of the first variation amount and that upon calculation of the second variation amount. Accordingly, it may be arranged such that the second misfire determination means performs misfire determination from a point where the change of the speed of the internal combustion engine is equal to or greater than a predetermined value or from the start of the internal combustion engine to a point where the change of rotational speed of the internal combustion engine is equal to or less than a predetermined value. Further, it may be arranged such that the second misfire determination means performs misfire determination after the start of the engine until the peak of rotational speed is detected.

Further, as there is a possibility of erroneous determination of misfire due to the second variation amount within a predetermined period after acceleration as well as the start of the engine, the misfire determination may be performed by the second misfire determination means. The acceleration state may be detected when the change amount of the number of rotations of the engine is large, or the acceleration state may be detected when the change amount of throttle valve opening is large by detecting the throttle valve opening.

Further, as in the case of the period after the start of the engine, upon acceleration, it may be arranged such that the second misfire determination means performs misfire determination from a point where the change of rotational speed of the internal combustion engine is equal to or greater than a predetermined value to a point where the change of rotational speed of the internal combustion engine is equal to or less than a predetermined value.

Further, in the above first embodiment, the first and second variation amounts are obtained from the deviation of rotational speed between two cylinders, however, the present invention is not limited to the deviation. For example, the variation amounts may be obtained from the ratio of rotational speed between two cylinders, or from deviation of time required for rotation to a predetermined crank angle between two cylinders or the ratio of time required for rotation to a predetermined crank angle between two cylinders.

Further, in the above embodiment, a six-cylinder internal combustion engine is employed, however, the present invention is also applicable to eight-cylinder and four-cylinder internal combustion engines. In case of eight-cylinder internal combustion engine, the final variation amount $\Delta\omega_n$ calculated at step 110 may be calculated as:

$$\Delta\omega n = (\omega_{n-1} - \omega_n) - (\omega_{n-5} - \omega_{n-4})$$

Further, in case of four-cylinder internal combustion engine, the final variation amount $\Delta\omega_n$ calculated at step 110 may be calculated as:

$$\Delta\omega n = (\omega_{n-1} - \omega_n) - (\omega_{n-3} - \omega_{n-2})$$

In the present embodiment, the rotational angle sensor 5 corresponds to the rotational angle signal output means; steps 100 to 103 in FIG. 2, the rotational speed calculation means; the processing to calculating $\omega_{n-1} - \omega_n$ at steps 108 and 110 in FIG. 2, the first variation amount calculation means; the processing to calculating $\omega_{n-4} - \omega_{n-3}$ at steps 106 and 110, the second variation amount calculation means; the processing of misfire determination at step 110 based on the final variation amount calculated at step 109, the first misfire determination means; the processing of misfire determination at step 110 based on the final variation amount calculated at step 108, the second misfire determination means; and step 104, the misfire counter. Further, steps 105 and 107 correspond to the processing to determine whether or not the vehicle is in a running state with a possibility of erroneous misfire detection due to the second variation amount.

<Second Embodiment>

In the first embodiment, the misfire determination level for the first misfire determination means and that for the second misfire determination means are set to the same level, however, different determination levels may be set for the respective misfire determination means.

Figure 8:
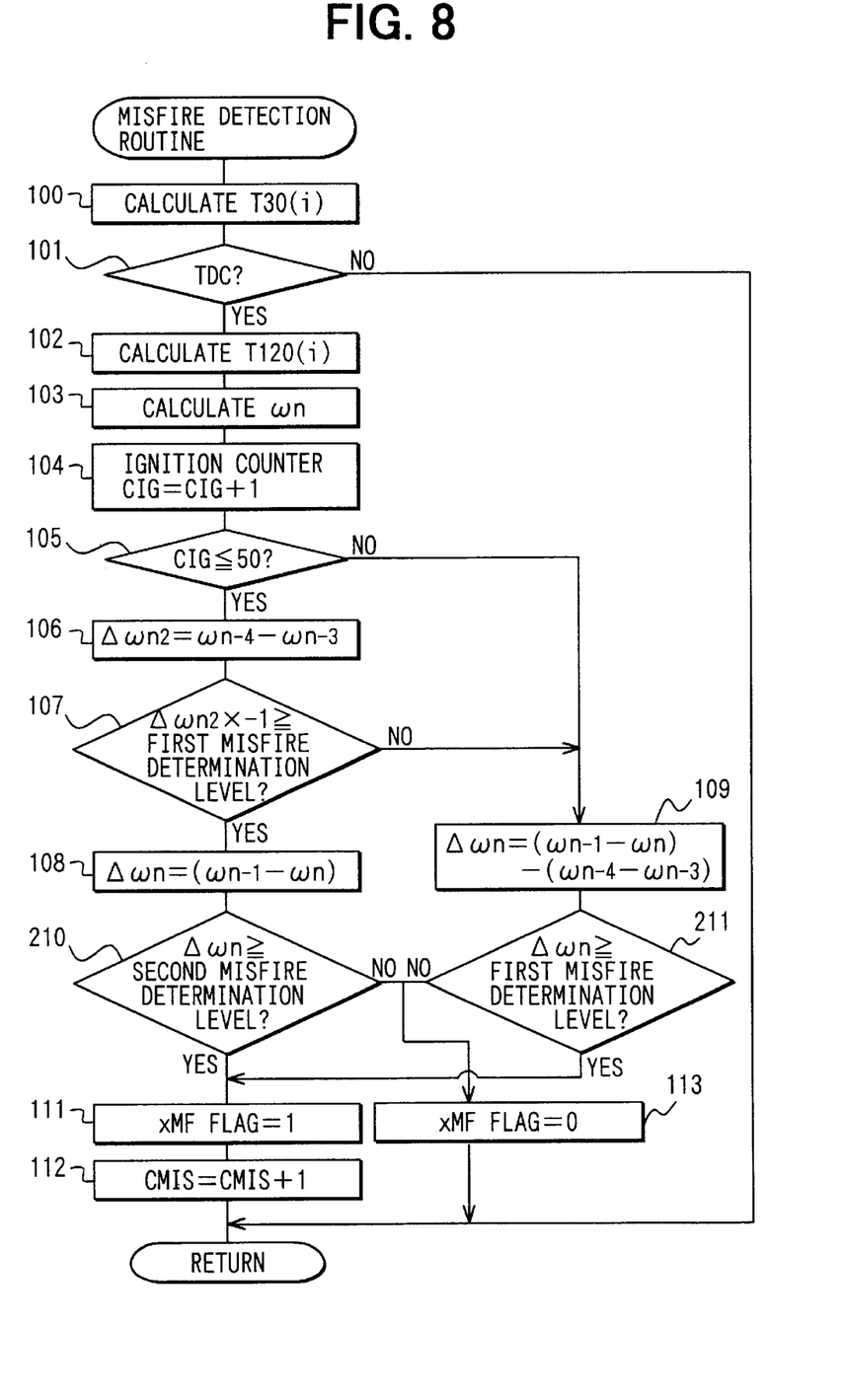
FIG. 8 is a flowchart showing a procedure of the misfire detection according to a second embodiment of the present invention.

Hereinbelow, an example where different determination levels are set will be described as a second embodiment with reference to the flowchart of FIG. 8. Note that steps identical to those in FIG. 2 of the first embodiment have the same reference numerals and the explanations of these steps will be omitted.

First, steps 100 to 108 are the same as those in FIG. 2 of the first embodiment. If a negative determination is made at step 105 or 107, i.e., if the first misfire detection means can perform misfire determination, the process proceeds to step 109, at which the final variation amount $\Delta\omega_n$ is calculated based on the expression (1) as in the case of the first embodiment. Then at step 211, the final variation amount $\Delta\omega_n$ is compared with a first misfire determination level.

As a result, if the final variation amount $\Delta\omega_n$ is equal to or greater than the first misfire determination level, it is determined that a misfire has occurred, then the process proceeds to step 111, and thereafter, the same processing as that in FIG. 2 is performed. On the other hand, if the final variation amount $\Delta\omega_n$ is less than the first misfire determination level, it is determined that a misfire has not occurred, then the process proceeds to step 113, and the same processing as that in FIG. 2 is performed.

Further, if it is determined at step 107 that the second variation amount $\Delta\omega_{n2} \times -1$ is greater than the first misfire determination level, the process proceeds to step 108, at which the final variation amount $\Delta\omega_n$ is calculated based on the expression (3). Then the process proceeds to step 210, at which the final variation amount $\Delta\omega_n$ calculated by the expression (3) is compared with a second misfire determination level.

The second misfire determination level is set to a value to detect misfire more easily than that of the first misfire determination level. That is, in the running state where the second misfire detection means performs misfire determination, as the rotational speed is increasing, the variation amount of rotation upon occurrence of misfire is small. Accordingly, the second misfire determination level is set to a lower level than the first misfire determination level as a misfire determination level at normal times, thereby the precision of the misfire detection can be improved.

If it is determined at step 210 that the final variation amount $\Delta\omega_n$ is greater than the second misfire determination level, the process proceeds to step 111, at which the flag indicative of occurrence of misfire is set to 1, and the process proceeds to step 112. At step 112, the misfire counter CMIS is incremented (CMIS=CMIS+1), and the present routine ends. On the other hand, if it is determined at step 210 that the final variation amount $\Delta\omega_n$ is less than the second misfire determination level, the process proceeds to step 113, at which the flag xMF is set to 0 to indicate that a misfire has not occurred, and the present routine ends.

As described above, the precision of misfire detection by the second misfire determination means can be improved by setting a level lower than the first misfire determination level as the second misfire determination level.

While the above-described embodiments refer to examples of usage of the present invention, it is understood that the present invention may be applied to other usage, modifications and variations of the same, and is not limited to the disclosure provided herein.

What is claimed is:

1. A misfire detection apparatus for an internal combustion engine comprising:

rotational angle signal output means for outputting a rotational angle signal at a predetermined rotational angle in accordance with rotation of an output shaft of a multiple cylinder internal combustion engine;

rotational speed calculation means for calculating a rotational speed of the output shaft of the internal combustion engine in each cylinder based on the rotational angle signal outputted from the rotational angle signal output means;

first variation amount calculation means for calculating a rotational speed between two cylinders where expansion strokes are successively made, said first variation calculating means calculating by using the rotational speed calculation means and calculating a first variation amount based on the rotational speed between the two cylinders;

second variation amount calculation means for calculating the rotational speed between two cylinders of the internal combustion engine by using the rotational speed calculation means, said second variation calculating means calculating a second variation amount based on a rotational speed between the two cylinders;

first misfire determination means for performing misfire determination based on the first variation amount and the second variation amount; and second misfire determination means for performing misfire determination based on the first variation amount;

whereby the second misfire determination means performs misfire determination during engine running when a possibility of erroneous misfire detection due to the second variation amount exists.

2. A misfire detection apparatus for an internal combustion engine according to claim 1, wherein the second variation amount calculation means calculates the rotational speed between two cylinders ahead of the first variation amount calculated by the first variation amount calculation means by a rotational angle of 360° CA where expansion strokes are successively made, the second variation amount calculation means calculating by using the rotational speed calculation means and calculates the second variation amount based on a rotational speed deviation between the two cylinders.

3. A misfire detection apparatus for an internal combustion engine according to claim 1, wherein the second variation amount calculation means calculates the rotational speed between two cylinders ahead of the first variation amount calculated by the first variation amount calculation means by a rotational angle of 720° CA where expansion strokes are successively made, the second variation calculating means calculating by using the rotational speed calculation means and calculating the second variation amount based on a rotational speed deviation between the two cylinders.

4. A misfire detection apparatus for an internal combustion engine according to claim 1, wherein the second variation amount calculation means calculates the rotational speed between cylinders away from each other by an integer multiple of a crank angle as minimum-unit, the minimum unit obtained by dividing a crank angle necessary for one combustion cycle of each cylinder by the number of cylinders by using the rotational speed calculation means and calculating a value, the value obtained by dividing the rotational speed deviation between the two cylinders away from each other by the integer multiple of the crank angle by the integer, as the second variation amount;

wherein the first misfire determination means performs misfire determination based on the first variation amount and the second variation amount.

5. A misfire detection apparatus for an internal combustion engine according to claim 1, further comprising:

a spark plug that generates a spark to cause combustion of air-fuel mixture in the internal combustion engine; and an ignition counter that counts a number of ignitions of the spark plug;

wherein the running state with a possibility of erroneous misfire detection due to the second variation amount is a state after the start of the internal combustion engine until the number of ignitions counted by the ignition counter becomes a predetermined number.

6. A misfire detection apparatus for an internal combustion engine according to claim 1, wherein the running state with a possibility of erroneous misfire detection due to the second variation amount is a state where the second variation amount, calculated by the second variation amount calculation means based on the rotational speed of the internal combustion engine, is greater than a first predetermined value.

7. A misfire detection apparatus for an internal combustion engine according to claim 1, wherein the running state with a possibility of erroneous misfire detection due to the second variation amount is a state where a change rate of the rotational speed calculated by the rotational speed calculation means is equal to or greater than a second predetermined value.

8. A misfire detection apparatus for an internal combustion engine according to claim 7, wherein the running state with a possibility of erroneous misfire detection due to the second variation amount is a state between a point where a change rate of the rotational speed calculated by the rotational speed calculation means is equal to or greater than the second predetermined value to a point where the change rate of the rotational speed calculated by the rotational speed calculation means is equal to or less than a third predetermined value which is less than the second predetermined value.

9. A misfire detection apparatus for an internal combustion engine according to claim 1, wherein the first misfire determination means determines that a misfire has occurred in the internal combustion engine if a deviation between the first variation amount and the second variation amount is greater than a first determination level; and wherein the second misfire determination means determines that a misfire has occurred in the internal combustion engine if the first variation amount is greater than a second determination level.

10. A misfire detection apparatus for an internal combustion engine according to claim 9, wherein the second misfire determination level is a value that allows detection of misfire more easily than that of the first misfire determination level.

11. A misfire detection apparatus for an internal combustion engine comprising:
- rotational angle signal output means for outputting a rotational angle signal at a predetermined rotational angle in accordance with rotation of an output shaft of a multiple cylinder internal combustion engine;
- rotational speed calculation means for calculating a rotational speed of the output shaft of the internal combustion engine in each cylinder based on the rotational angle signal outputted from the rotational angle signal output means;
- first variation amount calculation means for calculating the rotational speed between two cylinders where expansion strokes are successively made, the first variation amount calculating means calculating by using the rotational speed calculation means and calculating a first variation amount based on the rotational speed between the two cylinders;
- second variation amount calculation means for calculating the rotational speed between two cylinders by the rotational speed calculation means, the second variation amount calculating means calculating a second variation amount based on the rotational speed between the two cylinders;
- first misfire determination means for performing misfire determination based on the first variation amount and the second variation amount;
- correction means for correcting the second variation amount; and
- second misfire determination means for performing misfire determination based on the second variation amount corrected by the correction means and the first variation amount;
- wherein the second misfire determination means performs misfire determination in a running state with a possibility of erroneous misfire detection due to the second variation amount not corrected by the correction means.

12. A misfire detection apparatus for an internal combustion engine according to claim 11, wherein the first misfire determination means determines that a misfire has occurred if a deviation between the first variation amount and the second variation amount is greater than a first determination level; and
- wherein the second misfire determination means determines that a misfire has occurred if the deviation between the first variation amount and the second variation amount corrected by the correction means is greater than a second determination level.

13. A misfire detection apparatus for an internal combustion engine according to claim 12, wherein the second misfire determination level is a value to detect the misfire more easily than that of the first misfire determination level.

14. A misfire detection apparatus for an internal combustion engine according to claim 11, wherein the second variation amount calculation means calculates the rotational speed between two cylinders ahead of the first variation amount calculated by the first variation amount calculation means by a rotational angle of 360° CA where expansion strokes are successively made, the second variation amount calculation means calculating by using the rotational speed calculation means and calculates the second variation amount based on a rotational speed deviation between the two cylinders.

15. A misfire detection apparatus for an internal combustion engine according to claim 11, wherein the second variation amount calculation means calculates the rotational speed between two cylinders ahead of the first variation amount calculated by the first variation amount calculation means by a rotational angle of 720° CA where expansion strokes are continuously made, the second variation calculating means calculating by using the rotational speed calculation means and calculates the second variation amount based on a rotational speed deviation between the two cylinders.

16. A misfire detection apparatus for an internal combustion engine according to claim 11, wherein the second variation amount calculation means calculates the rotational speed between cylinders away from each other by an integer multiple of a crank angle as minimum-unit, the rotational speed obtained by dividing a crank angle necessary for one combustion cycle of each cylinder by the number of cylinders and by using the rotational speed calculation means to calculate a value obtained by dividing the rotational speed deviation between the two cylinders away from each other by the integer multiple of the crank angle by the integer, as the second variation amount;
- wherein the first misfire determination means performs misfire determination based on the first variation amount and the second variation amount.

17. A misfire detection apparatus for an internal combustion engine according to claim 11, further comprising running state detection means for detecting a running state of the internal combustion engine;
- wherein the correction means sets a correction amount to correct the second variation amount based on the running state of the internal combustion engine detected by the running state detection means and corrects the second variation amount based on the correction amount.

18. A misfire detection apparatus for an internal combustion engine according to claim 17, wherein the running state of the internal combustion engine detected by the running state detection means is a variation amount of the rotational speed calculated by the rotational speed calculation means.

19. A misfire detection apparatus for an internal combustion engine according to claim 18, wherein the running state of the internal combustion engine detected by the running state detection means is the second variation amount calculated by the second variation amount calculation means.

20. A misfire detection apparatus for an internal combustion engine according to claim 11, further comprising:
- a spark plug that generates a spark to cause combustion of air-fuel mixture in the internal combustion engine; and
- an ignition counter that counts a number of ignitions of the spark plug;
- wherein the running state with a possibility of erroneous misfire detection due to the second variation amount is a state after a start of the internal combustion engine until the number of ignitions counted by the ignition counter becomes a predetermined number.

21. A misfire detection apparatus for an internal combustion engine according to claim 11, wherein the running state with a possibility of erroneous misfire detection due to the second variation amount is a state where the second variation amount calculated by the second variation amount calculation means based on the rotational speed of the internal combustion engine is greater than a first predetermined value.

22. A misfire detection apparatus for an internal combustion engine according to claim 11, wherein the running state with a possibility of erroneous misfire detection due to the second variation amount is a state where a change rate of the rotational speed calculated by the rotational speed calculation means is equal to or greater than a second predetermined value.

23. A misfire detection apparatus for an internal combustion engine according to claim 22, wherein the running state with a possibility of erroneous misfire detection due to the second variation amount is a state between a point where the change rate of the rotational speed calculated by the rotational speed calculation means is equal to or greater than the second predetermined value to a point where the change rate of the rotational speed calculated by the rotational speed calculation means is equal to or less than a third predetermined value which is less than the second predetermined value.

24. A misfire detection apparatus for an internal combustion engine comprising:

rotational angle signal output means for outputting a rotational angle signal at a predetermined rotational angle in accordance with rotation of an output shaft of a multiple cylinder internal combustion engine;

rotational speed calculation means for calculating a rotational speed of the output shaft of the internal combustion engine in each cylinder, based on the rotational angle signal outputted from the rotational angle signal output means;

first variation amount calculation means for calculating the rotational speed between two cylinders where expansion strokes are successively made, the first variation amount calculating means calculating by using the rotational speed calculation means and calculating a first variation amount based on the rotational speed between the two cylinders;

second variation amount calculation means for calculating the rotational speed between two cylinders of the internal combustion engine by using the rotational speed calculation means, the second variation calculating means calculating a second variation amount based on the rotational speed between the two cylinders;

first misfire determination means for performing misfire determination based on the first variation amount and the second variation amount; and second misfire determination means for performing misfire determination based on the first variation amount;

wherein the second misfire determination means performs misfire determination for a predetermined period after the start of the internal combustion engine.

25. A misfire detection apparatus for an internal combustion engine comprising:

rotational angle signal output means for outputting a rotational angle signal at a predetermined rotational angle in accordance with rotation of an output shaft of a multiple cylinder internal combustion engine;

rotational speed calculation means for calculating a rotational speed of the output shaft of the internal combustion engine in each cylinder, based on the rotational angle signal outputted from the rotational angle signal output means;

first variation amount calculation means for calculating the rotational speed between two cylinders where expansion strokes are successively made, the first variation amount calculation means calculating by using the rotational speed calculation means and calculating a first variation amount based on the rotational speed between the two cylinders;

second variation amount calculation means for calculating the rotational speed between two cylinders of the internal combustion engine by using the rotational speed calculation means, the second variation amount calculation means calculating a second variation amount based on the rotational speed between the two cylinders;

first misfire determination means for performing misfire determination based on the first variation amount and the second variation amount; and second misfire determination means for performing misfire determination based on the first variation amount;

wherein the second misfire determination means performs misfire determination for a predetermined period after acceleration at the internal combustion engine.

* * * * *